United States Patent [19]

McCormick

[11] 4,436,443
[45] Mar. 13, 1984

[54] CONNECTING ROD

[75] Inventor: Daniel F. McCormick, Oshkosh, Wis.

[73] Assignee: Brunswick Corporation, Skokie, Ill.

[21] Appl. No.: 441,343

[22] Filed: Nov. 15, 1982

[51] Int. Cl.³ ............................................. F16B 19/02
[52] U.S. Cl. .................................... 403/14; 403/337;
403/24; 74/579 E; 123/197 AB
[58] Field of Search ................... 403/13, 14, 337, 24;
411/308, 309, 310, 311, 423, 436; 74/579 E, 579
R; 123/197 AB, 197 AC; 29/156.5 A, 149.5

[56] References Cited

U.S. PATENT DOCUMENTS

| 3,266,339 | 8/1966 | Schlectehdahl | 74/579 |
|---|---|---|---|
| 3,314,305 | 4/1967 | Friedrich | 74/579 |
| 3,411,378 | 11/1968 | Borgeaud | 74/579 |
| 3,455,587 | 7/1969 | Gallois | 74/579 |
| 3,482,468 | 12/1969 | De Biasse | 74/579 |
| 3,603,174 | 9/1971 | Patchen et al. | 411/423 X |
| 3,739,657 | 6/1973 | Patchen et al. | 74/579 E |
| 3,871,245 | 3/1975 | McKindree | 74/579 E |
| 3,889,553 | 6/1975 | Ballheimer | 74/579 E |
| 3,944,054 | 3/1976 | Ensinger | 198/816 |
| 4,114,961 | 9/1978 | Pithie | 74/579 E X |
| 4,384,555 | 5/1983 | Sato | 123/197 AC |
| 4,396,308 | 8/1983 | McCormick | 403/14 |

Primary Examiner—Cornelius J. Husar
Assistant Examiner—Joseph A. Fischetti
Attorney, Agent, or Firm—O. T. Sessions

[57] ABSTRACT

The invention provides a connecting rod assembly (10) for use in linking a piston (11) to a crankshaft and particularly provides a means for precisely aligning and attaching the connecting rod cap (15) to the connecting rod (12). The connecting rod assembly (10) uses bolts (18) extending through the cap (15) and engaging female screw threads (22) in the rod (12) to retain the cap (15) in place. Truncated female screw threads (23) are provided in the cap (15) to engage and distort the threads on the bolt (18) as the bolt (18) is tightened to align the rod (12) and cap (15) and to lock the bolt (18) in place.

10 Claims, 3 Drawing Figures

CONNECTING ROD

DESCRIPTION

1. Technical Field

This invention relates to connecting rods for use in internal combustion engines and particularly to the attachment of a connecting rod cap to the connecting rod.

Proper alignment of the connecting rod and connecting rod cap is essential since it determines the alignment of the two internal bearing surfaces of the crankshaft end of the connecting rod. This alignment is critical, particularly when roller bearings are used between the internal bearing surfaces and the crankshaft, since any misalignment results in a step between the bearing surfaces which must be traversed by the roller bearings. The alignment is even more crucial when used in a two-cycle, crankcase compression engine which relies on an air-fuel-oil mixture to lubricate the bearings.

2. Background Art

A connecting rod and cap formed from an integral blank which is cracked apart to form the rod and cap and create precisely mating surfaces is disclosed in U.S. Pat. No. 3,944,054 to Cuddon-Fletcher et al. Though generally satisfactory, the mating surfaces can be clamped together while slightly misaligned, thereby ruining the connecting rod and cap.

Another connecting rod and cap assembly is disclosed in U.S. patent application Ser. No. 187,110 filed on Sept. 15, 1980, now U.S. Pat. No. 4,396,309 by the present inventor. That assembly utilizes a bolt to attach the cap to the rod, the bolt having a knurled section engaging both the rod and cap for alignment purposes.

DISCLOSURE OF INVENTION

A connecting rod assembly is provided for connecting a piston to a crankshaft. The assembly includes a connecting rod joined to a connecting a connecting rod cap by a bolt to form a circular bearing surface. A first bore in the rod has female screw threads and a second bore in the cap is aligned with the first bore and also has female screw threads. The bolt has male screw threads with a first segment engaging the threads in the first bore and a second segment engaging the threads in the second bore. One of the threaded bores or one of the bolt segments has truncated threads to reduce the depth of engagement of the corresponding male and female threads. The threads engaging the truncated threads are distorted as the bolt is tightened, thereby providing both a centering action to assure alignment of the bores and a locking action to resist loosening of the bolt.

Preferably the female threads in one of the bores are truncated to provide the aligning and locking action, since this will distort the bolt threads, reducing the possibility of damage of the more expensive parts, i.e., the connecting rod and cap.

The invention is particularly suitable for use with a connecting rod and cap formed by cracking the rod and cap apart from a single connecting rod blank. The resulting connecting rod assembly provides a closely aligned rod and cap with an internal bearing surface suitable for use with roller bearings.

The invention thus provides a self-aligning connecting rod assembly which can be manufactured with little or no additional cost and can be consistently and accurately assembled without the use of jigs.

BEST MODE FOR CARRYING OUT THE INVENTION

Figure 1:
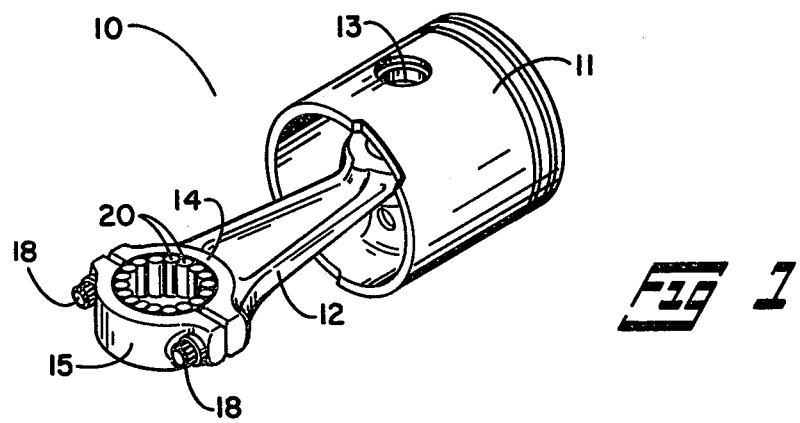
FIG. 1 is a perspective view of a piston and connecting rod according to the invention.
Figure 2:
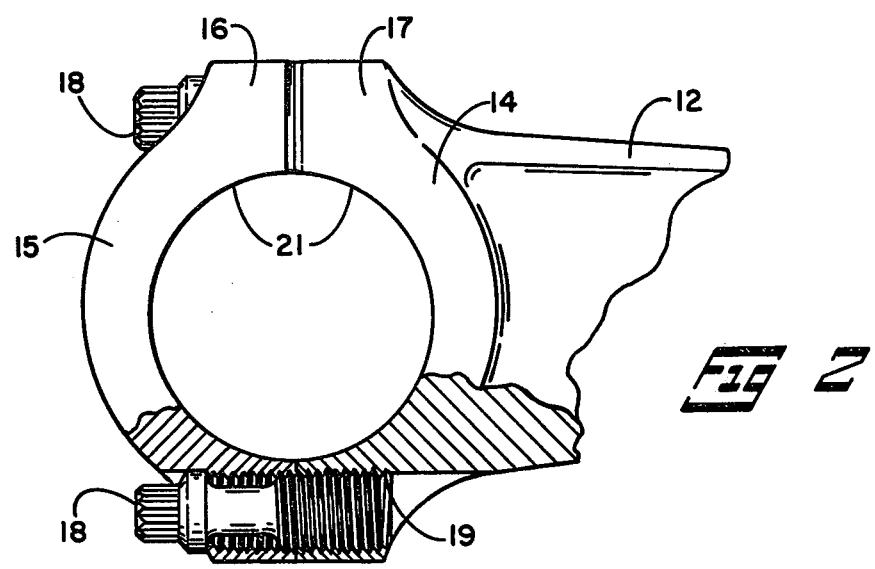
FIG. 2 is an enlarged view of the crankshaft end of the connecting rod of FIG. 1, partially in section.
Figure 3:
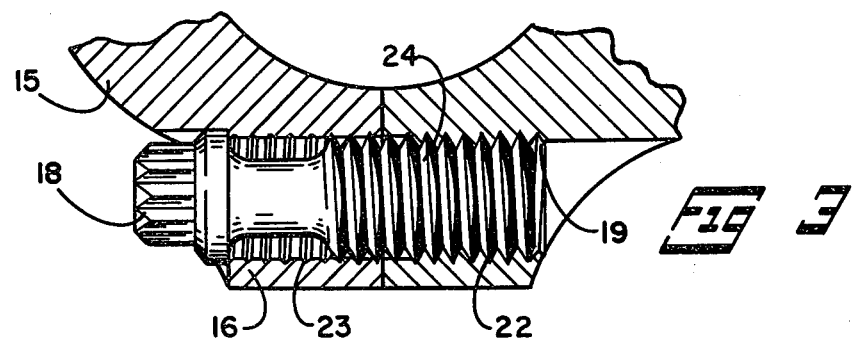
FIG. 3 is a further enlarged, sectional view showing details of the connecting rod bolt and engaging threads.

The connecting rod assembly 10 shown in the figures is intended to connect a piston 11 to the crankshaft of a two-cycle engine, not illustrated. The connecting rod assembly 10 includes a connecting rod 12 having a bearing formed at the piston end. A piston pin 13 extends through the piston 11 and bearing to pivotally attach the connecting rod 12 to the piston 11. At the crankshaft end of the connecting rod 12 a saddle portion 14 is formed. A connecting rod cap 15 has two lugs 16 aligned with the two lugs 17 on the saddle 14 and is attached to the rod 12 by bolts 18 which engage the threaded bores 19 in the connecting rod 12 and cap 15. Roller or needle bearings 20 are provided to ride on the circular bearing surface 21 formed by the connecting rod 12 and cap 15 and on the outer surface of the crankpin, not illustrated.

The screw threads in the rod 12 and cap 15 are provided to hold the cap 15 to the connecting rod 12 and to provide precise alignment of the cap 15 with the rod 12. To accomplish this purpose, full depth female screw threads 22 are provided in the bore in the connecting rod lugs 17 and truncated female threads 23 are provided in the bores in the connecting rod cap lugs 16. The truncated threads 23 in the cap 15 have the same major diameter as those in the rod and are formed continuous with the threads in the rod. The minor diameter of the truncated threads 23, however, is substantially larger than that of the threads in the rod 12, thus providing very shallow truncated threads in the cap 15.

The connecting rod bolts 18 are provided with male screw threads 24 to engage the female screw threads in both the rod 12 and cap 15. Because the truncated threads 23 in the cap 15 are formed continuously with those in the rod 12, the cap 15 must be closely aligned with the rod 12 before the bolts 18 can engage the threaded bores in the rods 12. Thus the rod 12 and cap 15 can be assembled without the use of jigs or clamps to hold the rod 12 and cap 15 in alignment during assembly.

Preferably the male threads 24 on the bolt 18 engage the truncated threads 23 in the cap 15 for a length of approximately three quarters of a bolt diameter after the rod 12 and cap 15 are assembled. Though the bolt 18 is illustrated as having its upper portion relieved of threads, a similar effect could be achieved by relieving the threads in the cap bore. When the bolts 18 are tightened to clamp the rod 12 and cap 15 together, the portion of the bolt within the cap bore is elongated, causing the truncated threads 23 in the cap bore to distort the corresponding engaging threads on the bolt 18. Since the threads have a generally triangular section, the bolt elongation and thread distortion is believed to provide a substantial force centering the bolt in the bore to precisely align the bores in the rod and cap, thereby aligning the rod 12 and cap 15. The distortion of the threads acts further to provide a locking force resisting removal of the bolt 18.

Preferably the bolts 18 are formed of a slightly softer material than the rod 12 and cap 15, thereby preventing damage to the threads in the rod 12 and cap 15. Thus the rod 12 and cap 15 can be disassembled and reassembled, using new bolts if necessary, and still preserve the precise alignment provided by the interaction of the screw threads. Of course, the engagement of the truncated threads with the bolt threads must be small enough to prevent a significant reduction in the clamping force provided by the bolt.

The connecting rod 12 and cap 15 are formed from a single, forged connecting rod blank by cracking the blank apart. Prior to the cracking process, the connecting rod blank is rough machined. The bolt holes are first drilled with a step drill to provide a first bore through the connecting rod and a second larger diameter, concentric bore through the cap and slightly into the rod portion of the blank. Screw threads are then cut in the bores using a tap. The drilled holes are sized to produce full depth threads in the first bore while producing very shallow, truncated threads in the second bore. The truncated threads must be deep enough to engage the bolt threads to accurately position the bolt, but not deep enough to substantially reduce the clamping force provided by the bolt.

Following the machining, the rod and cap are carburized, heat treated and then separated. The rod and cap are separated by an expandable arbor inserted in the crankshaft bearing bore. As the arbor is expanded, the connecting rod blank fractures along a separation plane defined by the grooves formed on each side of the blank. The mating surfaces thus formed on the rod and cap assist in holding the rod and cap in alignment.

After the cap and rod have been cracked apart, they are reassembled with the connecting rod bolts tightened to their design specification. The circular bearing surface formed by the rod and cap and the piston pin bore are then honed to their final configuration. Subsequently the cap is removed, cleaned and reassembled in place on the crankshaft, with the roller bearings in place.

In a test of the invention, six connecting rods were manufactured in accordance with the invention. Starting with forged connecting rod blanks intended for use in a 150 or 200 horsepower 1982 model Mercury outboard engine, the rods were first rough machined. Next the bolt holes were bored using the step drill having a large diameter of 0.300/0.302 inch and a small diameter of 0.270/0.275 inch. The bolt holes were then tapped using a 5/16-24 UNF tap.

After the connecting rod blanks were machined, they were carburized and heat treated. Then the caps were separated from the rods by cracking, as described above. After cracking, the rod and cap were reassembled using bolts one inch long and having UNF 5/16-24, class 3 threads. The threads were removed from the upper 0.3 inch adjacent the bolt head, thus leaving approximately 0.2 inch of threads to engage the truncated threads in the cap. The bolts were then tightened to 30 foot-pounds and the crankshaft bore was honed. The rod and cap were then disassembled, cleaned and reassembled. No jigs or other guides were used in the reassembly, but rather the alignment provided by the screw threads was relied on. The bolts were then tightened with a torque wrench to 30 foot-pounds.

Following this procedure, the circularity of the crankshaft bores of the six connecting rods were measured with a Bendix Indyron roundness measuring machine. The measuring machine had a sensitivity of less than 0.000050 inch and showed no deviation in roundness at the joints of the cap and rod on any of the six test connecting rods. Further, the joints could not be detected by scraping across them with a fingernail or lead pencil.

By comparison, production assembly of the cracked rod and caps for the 200 horsepower Mercury engine requires the misalignment of the rod and cap to be less than 0.00015 inch and are normally around 0.00010 inch. The normal rod joint can readily be detected by scraping across the joint.

The invention thus provides a marked improvement in connecting rod and cap alignment and is expected to substantially improve the bearing life while substantially reducing production costs.

I claim:

1. A connecting rod assembly for connecting a piston to a crankshaft, said assembly comprising:
   (A) a connecting rod having a first threaded bore, said first bore including female threads;
   (B) a connecting rod having a second threaded bore aligned with said first threaded bore, said second bore including female screw threads, said rod and cap joining together to form a circular bearing surface; and
   (C) a bolt having male screw threads, a first segment of said male threads engaging the female threads of said first threaded bore and a second segment of said male threads engaging the female threads of said second threaded bore, one of said threaded bores or one of said segments of male threads having truncated threads to reduce the length of engagement of the corresponding threads with said truncated threads and to act with the corresponding threads to distort said engaging threads as said bolt is tightened;
   thereby providing a centering action to assure alignment of said first bore and said second bore and a locking action to resist loosening of said bolt.

2. The connecting rod assembly defined in claim 1 wherein said bolt includes a head, said head engaging a surface on the one of said rod or said cap having or engaging said truncated threads.

3. The connecting rod assembly defined in claim 1 wherein all of said screw threads have a generally triangular cross section.

4. The connecting rod assembly defined in claim 1 wherein said rod and cap have mating surfaces formed by cracking said rod and cap apart from a single connecting rod blank.

5. The connecting rod assembly defined in claim 1 wherein said connecting rod assembly is of the type used in an engine having roller bearings between the connecting rod and crankshaft and wherein said circular bearing surface carries said roller bearings.

6. A connecting rod assembly for connecting a piston to a crankshaft, said assembly comprising:
   (A) a connecting rod having a first threaded bore, said first bore including female screw threads having a major and minor diameter;
   (B) a connecting rod cap having a second threaded bore, said second bore including female screw threads having a major diameter equal to said major diameter of said first threaded bore and a minor diameter, the minor diameter of one of said threaded bores being larger than the other of said bores, said rod and cap forming a circular bearing surface; and (C) a bolt having male screw threads engaging said female threads of both said bores, said screws threads of said one of said bores being sufficiently shallow to distort the corresponding engaging threads of said bolt as said bolt is tightened;

whereby said distorted threads of said bolt provide a centering action to assure alignment of said first bore and said second bore and provide a locking action to resist loosening of said bolt.

7. The connecting rod assembly defined in claim 6 wherein said bolt includes a head, said head engaging a surface on the one of said rod or cap having said threaded bore with a larger minor diameter.

8. The connecting rod assembly defined in claim 6 wherein all of said screw threads have a generally triangular cross section.

9. The connecting rod assembly defined in claim 6 wherein said rod and cap have mating surfaces formed by cracking said rod and cap apart from a single connecting rod blank.

10. The connecting rod assembly defined in claim 6 wherein said connecting rod assembly is of the type used in an engine having roller bearings between the connecting rod and crankshaft and wherein said circular bearing surface carries said roller bearings.

* * * * *